United States Patent
Shah et al.

(10) Patent No.: US 7,155,101 B2
(45) Date of Patent: Dec. 26, 2006

(54) MANUFACTURING METHOD FOR HIGH TEMPERATURE FIBER OPTIC ACCELEROMETER

(75) Inventors: Jagdish Shah, Wallingford, CT (US); Rogerio T. Ramos, Chandler's Ford (GB); Olivier Sindt, Cheltenham (GB); Philip Dryden, Danbury, CT (US); Cliff Evans, Newtown, CT (US); Mark Dalton, Danbury, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 46 days.

(21) Appl. No.: 10/843,097

(22) Filed: May 11, 2004

(65) Prior Publication Data

US 2005/0016272 A1    Jan. 27, 2005

Related U.S. Application Data

(60) Provisional application No. 60/470,159, filed on May 13, 2003.

(51) Int. Cl.
*G02B 6/00* (2006.01)
*G02B 6/36* (2006.01)
*G01P 15/00* (2006.01)

(52) U.S. Cl. .................. 385/128; 385/12; 73/514.01; 73/514.26

(58) Field of Classification Search .................. None
See application file for complete search history.

(56) References Cited

U.S. PATENT DOCUMENTS

| 5,060,593 | A | * | 10/1991 | Ruffin et al. ............... 118/85 |
| 5,432,699 | A | | 7/1995 | Hache et al. ............... 364/422 |
| 5,903,349 | A | | 5/1999 | Vohra et al. ............... 356/345 |
| 6,533,883 | B1 | * | 3/2003 | Tanaka et al. ............... 156/169 |
| 6,650,418 | B1 | * | 11/2003 | Tweedy et al. ............ 356/477 |
| 6,671,057 | B1 | | 12/2003 | Orban ...................... 356/496 |
| 6,725,924 | B1 | | 4/2004 | Davidson et al. ...... 166/250.01 |

* cited by examiner

*Primary Examiner*—Rodney Bovernick
*Assistant Examiner*—Omar Rojas
(74) *Attorney, Agent, or Firm*—Jody Lynn DeStefanis; William Batzer; Dale Gaudier

(57) ABSTRACT

A method of making a fiber optic accelerometer includes (a) drawing an optical fiber through a resin; (b) winding the resin coated fiber onto a disc mounted on an assembly having a central shaft; and (c) curing the resin-coated fiber. The optical fiber may be drawn through a resin by providing a container filled with a resin having an orifice therethrough and drawing the fiber through the orifice. The resin may be cured such that the fiber is bonded to the disc by curing the resin to the fiber and the disc at the same time.

4 Claims, 12 Drawing Sheets

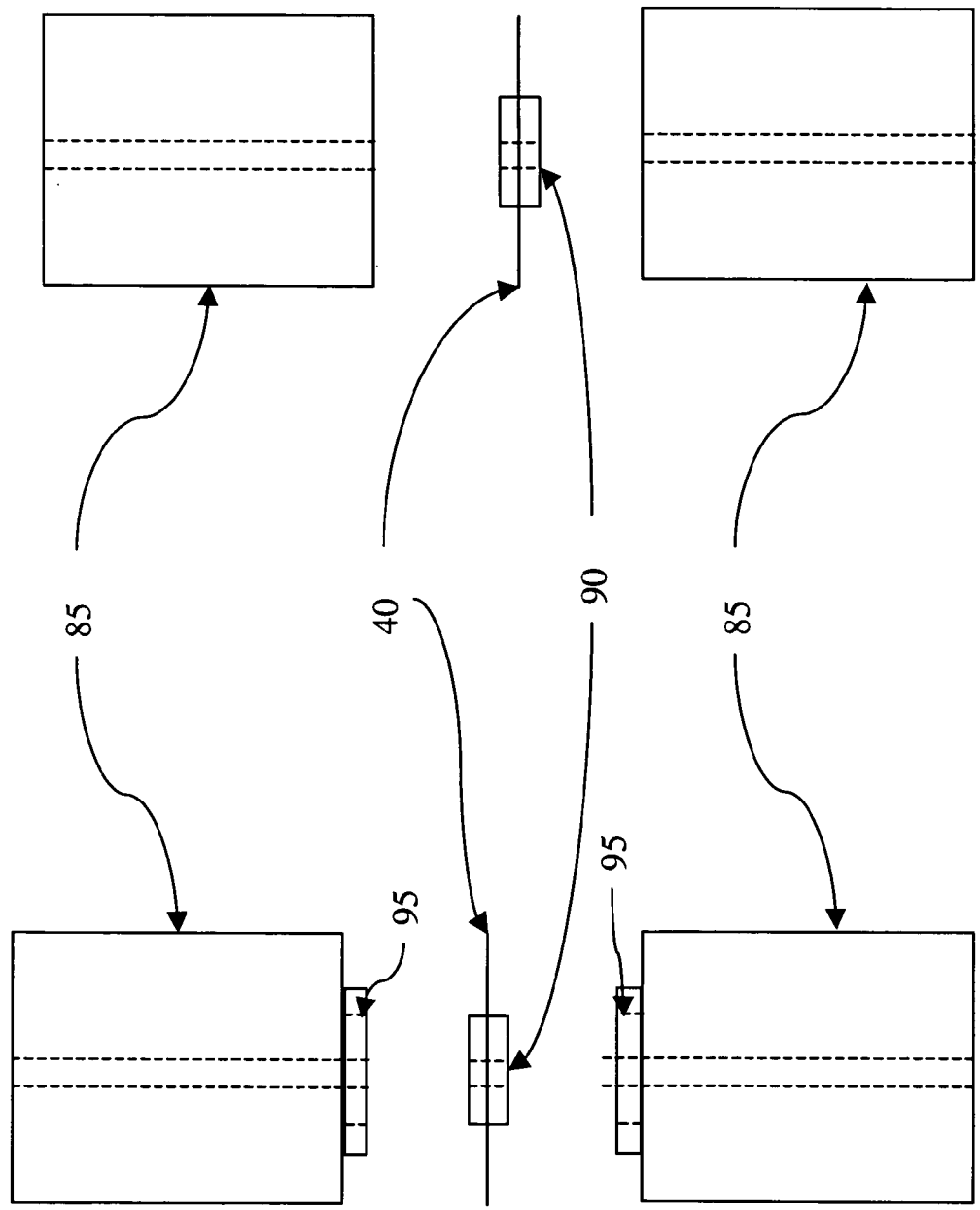

MANUFACTURING METHOD FOR HIGH TEMPERATURE FIBER OPTIC ACCELEROMETER

The present patent application claims priority to U.S. Provisional Patent Application No. 60/470,159, filed May 13, 2003, incorporated by reference herein in its entirety.

The United States Government has certain rights to this invention pursuant to Contract No. NCRADA-NRL-00-273 between the United States Government (Department of the Navy) and Schlumberger Technology Corporation.

FIELD OF THE INVENTION

The present invention relates to optical fiber accelerometers suitable for high temperature applications and methods of manufacturing the same.

BACKGROUND OF THE INVENTION

Measurements of the earth's gravitational acceleration, and measurements of differences in the earth's gravitational acceleration between different depths in the earth, can be useful in determining the bulk density (or specific gravity) of various earth formations, among other applications. More particularly, measurements of gravity difference between two positions or depths may be used to determine whether the formation is primarily oil, water or gas filled at various depths and geographic locations in the earth.

Accelerometers are traditionally used to measure these minute changes in gravity. In the area of oilfield investigation and earth formation characterization, accelerometers may be deployed in wireline applications, logging while drilling applications, or using coiled tubing.

U.S. Pat. No. 5,903,349 to Vohra et al. (the '349 patent) discloses a high performance optical fiber accelerometers using a flexural disc. While this accelerometer has many useful applications, its performance deteriorates in high temperature environments (above 70 degrees Celsius), such as that found in oilfield applications.

Accordingly, it is one object of the present invention to provide an apparatus and method of manufacturing the same to allow high temperature operation.

SUMMARY OF THE INVENTION

In accordance with the present invention, materials were selected and a new assembling method was devised to produce a fiber optic accelerometer able to operate at temperatures up to 150 degrees Celsius. A design variation without a gap between fiber coils and center shaft was proposed in order to facilitate manufacturing. Sensors were built and characterized. A variation of about 0.5 dB in scale factor was observed between room temperature operation and 150 degrees Celsius during prototype tests.

The manufacturability of the sensor has become much simpler because the winding and curing of the fiber is performed in contact with the disc, thus removing a step from the process of attaching the fiber to the coil as required in U.S. Pat. No. '349 and making the bond to the disc stronger. The advent of the sensor without a gap between fiber coil and center shaft also facilitates the manufacturing of the device.

Accordingly, one embodiment of the present invention is a method of manufacturing a fiber optic accelerometer, comprising: (a) drawing an optical fiber through a resin; (b) winding said resin coated fiber onto a disc. Preferably, any excess resin is removed from the fiber either before the coil is wound or during winding. The disc is mounted on an assembly having a central shaft. Depending on the desired performance of the accelerometer a gap may be provided between central shaft and the resin coated fiber. In a preferred method, the optical fiber is drawn through a container filled with a resin. The container has an orifice through which the fiber is drawn.

In a second embodiment, a fiber optic accelerometer is disclosed comprised of resin-coated fibers wound on a disc to create two fiber coils. The disc is mounted on an assembly having a central shaft. A gap may be provided between the fiber coils and the central shaft. The resin may comprised of Ciba Geigy GY6010 hardened with HY5200 or another appropriate resin.

Further features and applications of the present invention will become more readily apparent from the figures and detailed description that follows.

BRIEF DESCRIPTION OF THE DRAWINGS

FIGS. 10(a) and 10(b) are diagrams of assembly molds and disc for: (a) the design with a gap and (b) the design without the gap.

DETAILED DESCRIPTION

Figure 1:
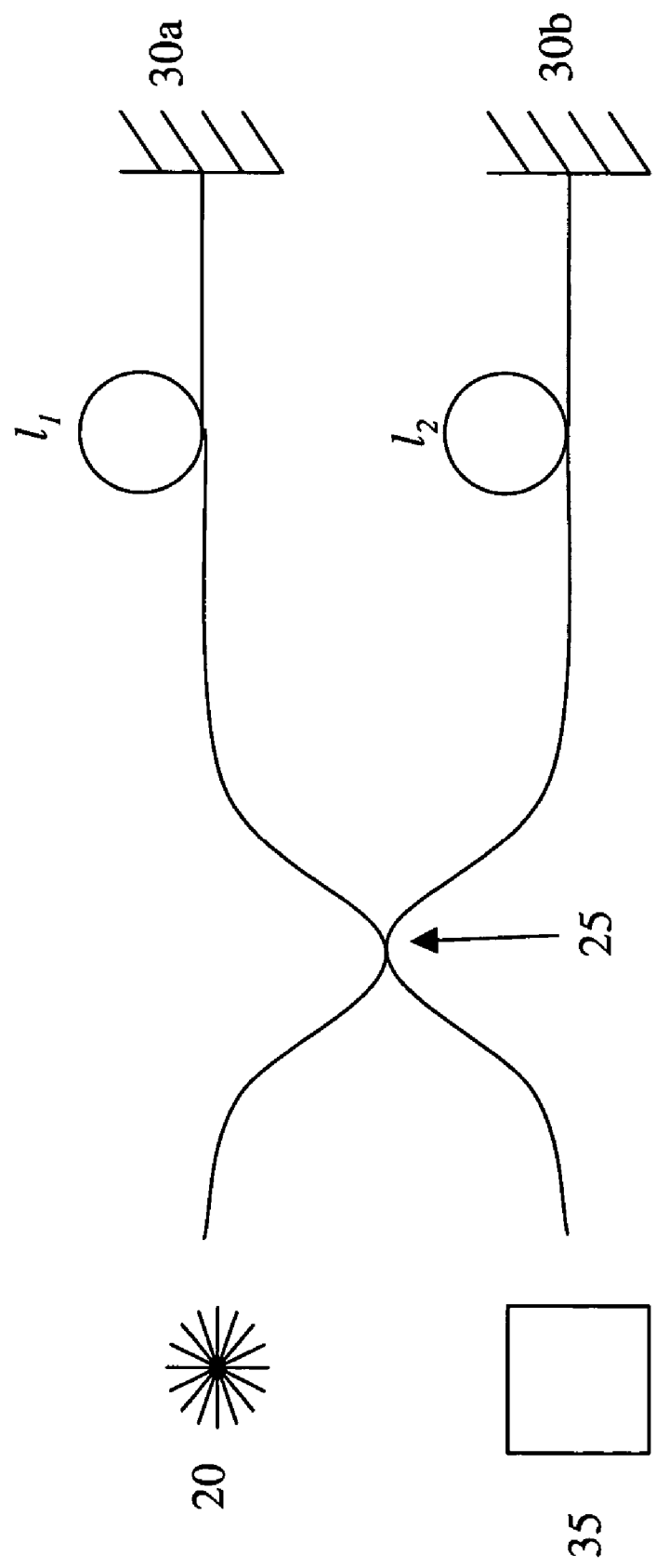
FIG. 1 is an optical diagram of an accelerometer.

The optical fiber accelerometer used herein is based on the Michelson interferometer as shown in FIG. 1, having a light source 20, two fiber coils $l_1$, $l_2$, a fiber coupler 25, two mirrors 30a, 30b, and a detector 35. The signal at the detector is proportional to the phase difference between the optical signals reflected by each mirror. The phase mismatch changes as stress on the fiber coils $l_1$, $l_2$ in each arms of the interferometer varies with acceleration.

Figure 2:
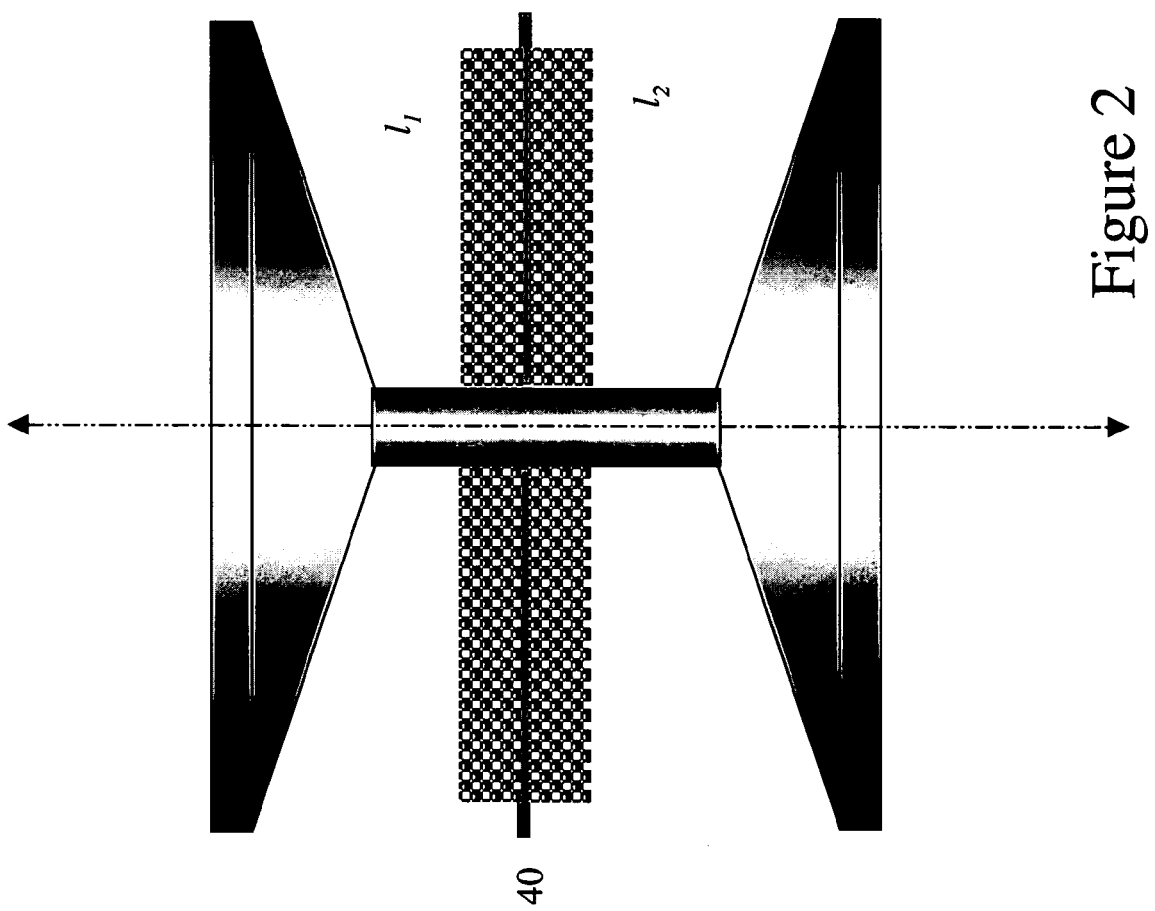
FIG. 2 is a diagram of a fiber optic accelerometer.

FIG. 2 is a diagram of a fiber optic accelerometer 10. Fiber coils $l_1$, $l_2$ are attached to opposite sides of a flexural disc 40, which may be supported by either the edges or the center (as shown in FIG. 2). When the transducer is subjected to upwards acceleration, the fiber coil $l_1$ attached to the top of the disc is extended, while the coil $l_2$ at the bottom of the disc is compressed. This generates a path imbalance between the arms of the interferometer to provide the phase shift for detection.

Fiber Selection

Preferably, the fiber selected has a high numerical aperture (NA). High NA fibers ($NA=\sqrt{n_{core}^2-n_{cladding}^2}$), also known as bend insensitive fibers, can provide a large contrast in index of refraction between core and cladding to insure total internal reflection of the light traveling in the fiber to continue to be guided even through tight bends. Normal single mode fiber NA is about 0.11, while a high NA is about 0.17. Accordingly, a preferred NA is greater than about 0.11, most preferably about 0.17. High NA fibers allow smaller winding diameter than standard fibers and therefore allows for smaller sensors.

Further, it is preferable that the fiber selected have a small overall outer diameter. The thinner the fiber is, the longer the total length of fiber in each coil, accounting for higher sensitivity. Commercial optical fiber for telecommunications applications are normally made with a cladding diameter of 125 μm. Optical fiber developed for specific application on optical fiber gyroscopes are available with a cladding diameter of 80 μm. The thickness of the polymer coating protecting the cladding should also be minimized. Traditional Acrylate coatings tend to be thicker (about 63 μm) than other harder coatings, such as Polyimide (about 15 μm). Accordingly, it is preferred that the cladding diameter be less than 125 μm, preferably around 80 μm. Further, coating diameters should be less than 63 μm, preferably around 15 μm.

The fiber selected should be able to withstand high temperature operation. The maximum operating temperature of an optical fiber depends on the kind of polymer buffer used to protect the cladding surface. Traditional Acrylate coated fibers are specified to operate up to temperatures of about 85 degrees Celsius (it is noted that limited laboratory tests have shown that this coating may be efficient up to 150 degrees Celsius). Alternatively, Polyimide coated fibers with operating temperatures of about 300 degrees Celsius may be used. It is desirable to have a hermetic coating deposited between the cladding and the polymer buffer in order to prevent OH and H ions from contacting the fiber. OH and H contamination can increases losses and reduce mechanical strength. Thin carbon coatings have proved to be reasonably effective to provide hermeticity.

For the purposes of the examples presented herein and with these requirements in mind, the two following fibers were tested: (1) Acrylate coated, 80 μm cladding diameter, Gyrosil™ BF06159 and (2) Carbon and Polyimide (Pyrocoat™) coated, 80 μm cladding diameter BF06159-02. Both of these fibers were obtained from Optical Fiber Solution of Avon, Connecticut USA (a subsidiary of Furukawa).

Resin Selection

Figure 3:
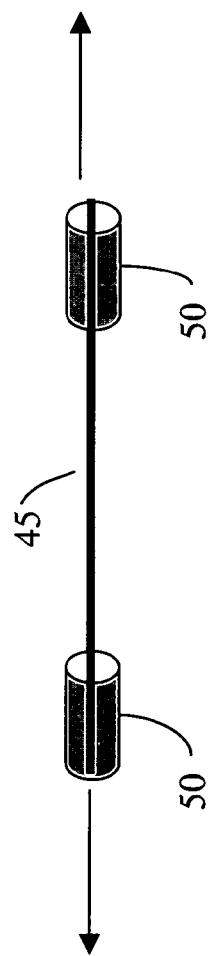
FIG. 3 is a schematic describing the testing scenario of the bonding strength between the resin and the fiber (the adhesion test).

In order to understand resins commercially available, various resins were tested. Because the weakest part of the system is expected to be the bonding between the fiber and resin due to the fiber buffer material. Accordingly, the strength of the bonding between the fiber 45 and the resin 50 was tested by adding resin 50 to both ends of the fiber 45. The fiber 45 is then placed under tension by gripping the coated fiber at both ends, as shown in FIG. 3, using a Dynamic Mechanical Analyzer DMA2980 from TA Instruments. The two resins tested were: (1) Epoxy: Ciba Geigy Resin ref. GY 6010, hardener ref. HY 5200 at 100/23 w/w and (2) Polyimide: Matrimind 5218CH dissolved in THF tetrahydrofuran at 30% w/w.

Figure 4:
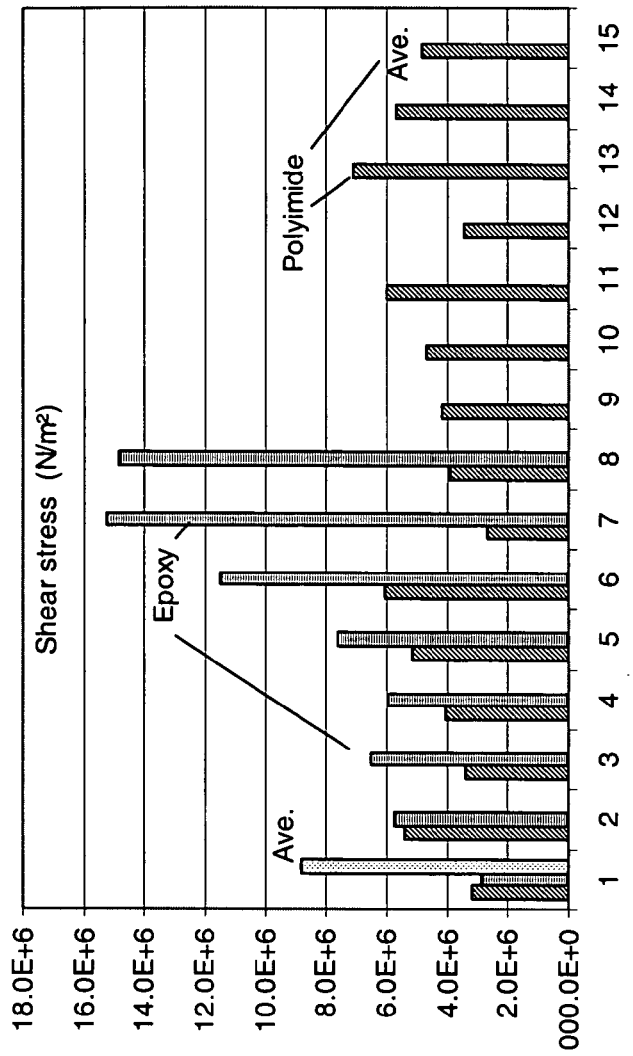
FIG. 4 is a chart depicting the results of the separation shear stress for several samples using Epoxy and Polyimide.

The Epoxy was mixed and placed in a vacuum chamber for about 10 minutes to release some of the air bubbles introduced during mixing. The Epoxy was then placed on the fiber using silicon rubber molds and cured in temperature steps of 20 degrees Celsius from 70 to 150 degrees Celsius of 0.5 to 1 hour each. The shear strength of the resin to fiber adhesion was estimated from the separation force F by $\sigma=F/l\lambda OD_{fiber}$, where F is the force applied, l is the length of the resin-coated region of the fiber and $OD_{fiber}$ is the outer diameter of the resin-coated region of the fiber. The results of the tests are shown in FIG. 4.

It was believed that the Polyimide resin would adhere well to Polyimide coated fiber. However, the tests showed that the Epoxy resin has better adhesion. Accordingly, the Ciba Geigy GY6010/HY5200 system is a preferred resin.

It is noted that the following resins were also considered/ tested using other techniques: Clamart resin XD4510 hardener XD4511 mixed at 100/50 w/w and Ciba Geigy resin MY720 and hardener HY5200 mixed at 100/35 w/w. The Ciba Geigy GY6010/HY5200 system had preferably characteristics over these resins.

Winding Process

Figure 5B:
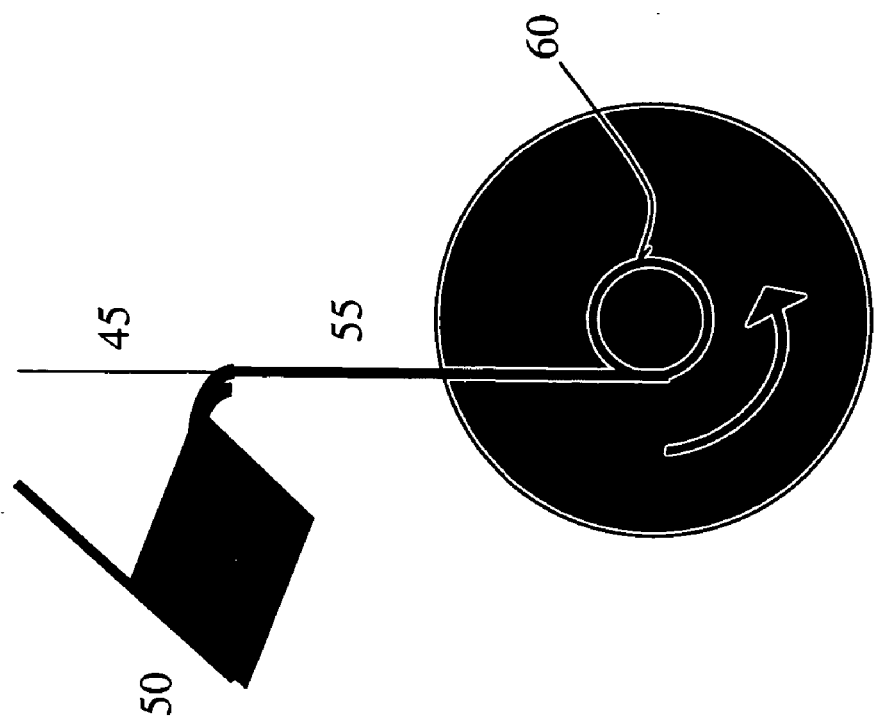
FIGS. 5(a) and 5(b) are schematic cross-sections showing a method of wetting the fiber with resin.
Figure 5A:
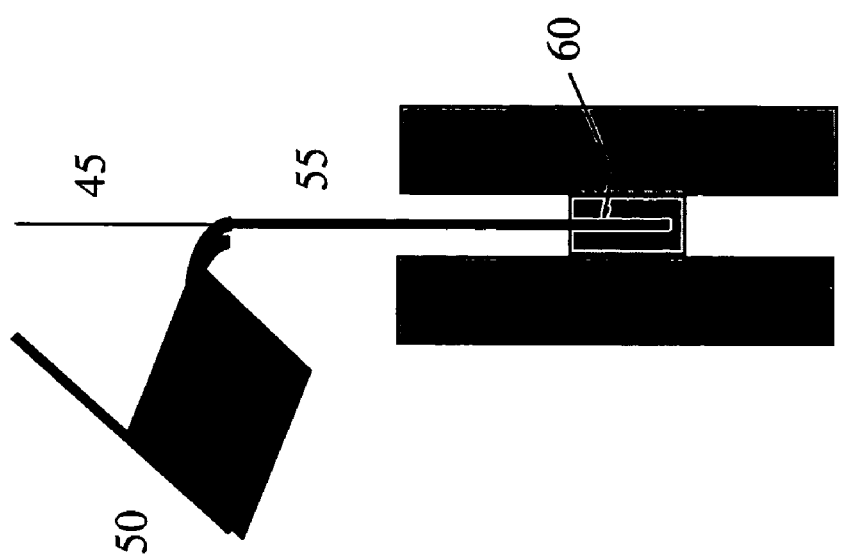

Several preliminary tests were performed to refine the assembling method. Initially, the fiber coils were wound with the epoxy and cured separately from the supporting disc, as described in the '349 patent. The first tests were performed with copper wires used for transformers. Initially, the resin was poured from a cup 50 on the fiber 45, as illustrated in FIGS. 5(a) and (b). The resin-coated wire 55 was then wound onto a Teflon coil 60. While this method was adequate, it was difficult to ensure that the fiber was sufficiently wetted with resin.

Figure 6B:
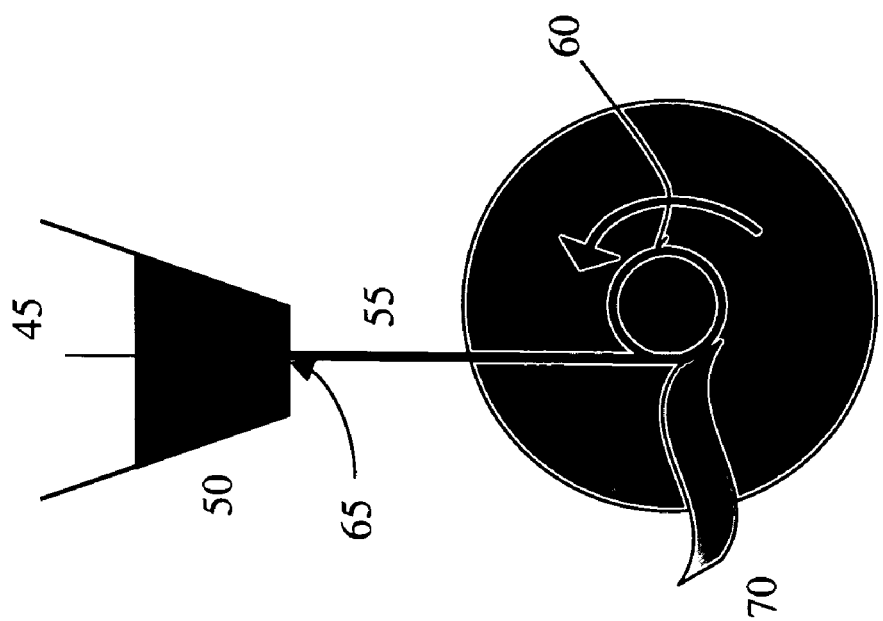
FIGS. 6(a) and 6(b) are schematic cross-sections showing a second method of wetting the fiber with resin using a container with a hole.
Figure 6A:
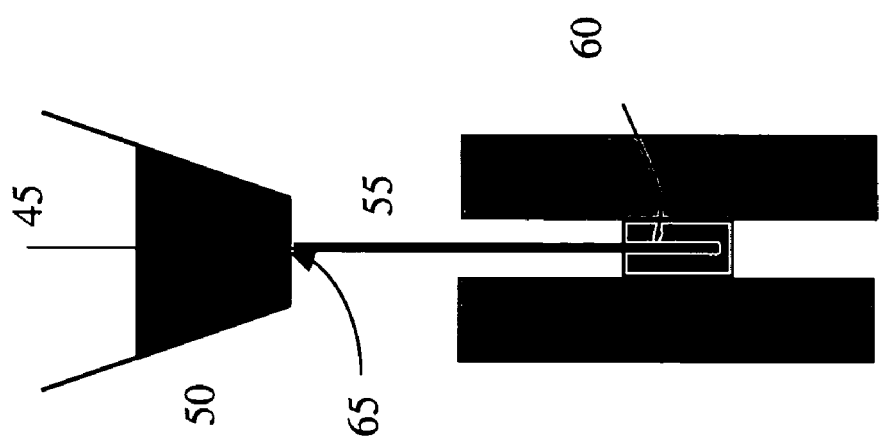

Accordingly, an improved method was developed, using a cup of resin 50 with a hole 65 through which the fiber is pulled into the coil 60, as illustrated in FIGS. 6(a) and (b). In this improved method, a wipe 70, such as a brush or cloth is used to remove excess resin from the coil. This configuration proved to be quite efficient.

As described above, the Epoxy (Ciba Geigy ref. GY6010, hardener ref. HY5200 at 100/23 w/w) was mixed and placed in a vacuum chamber for about 10 minutes to release some of the air bubbles introduced during mixing. The Epoxy was cured in steps of 20 degree Celsius from 70 to 150 degrees Celsius of 0.5 to 1 hour each.

To avoid running of the Epoxy due to gravity during curing, the discs are rotated during curing. Running of the Epoxy produces a small lump of resin at the lower side of the coil, which breaks the symmetry of the design and may increase the cross-axial sensitivity of the accelerometer.

Figure 7:
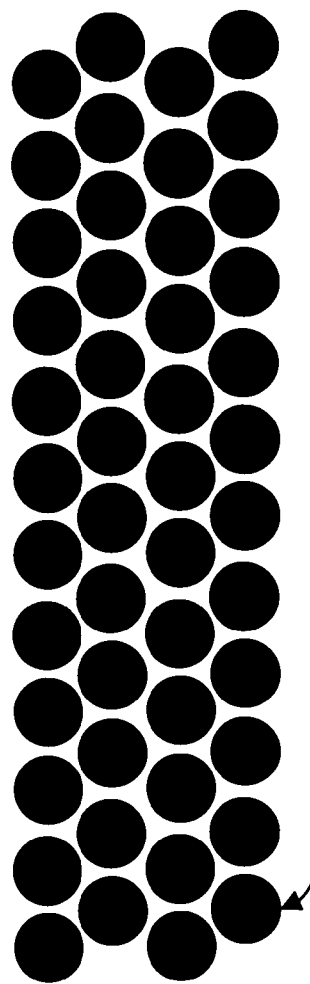
FIG. 7 shows the optimum packing of fibers to ensure minimum volume and maximum fiber length.

A test coil was prepared using copper wire and Epoxy. The sample was cured and cut in half for examination. Due to the size of the wire and the dimensions of the coil, the machine used to wind the coil did not have the ability to provide an optimum packing of the fibers 55, as shown in FIG. 7.

A second coil was prepared using Polyimide coated fiber with 125 μm cladding diameter (which was cheaper and more readily available than the 80 μm type) and the technique described above. The coil was cut and the cut faces were polished and examined under a microscope. Analysis of this sample identified dense packing of fibers. While the packing of the coated fibers was not optimal, adequate filling of the inter-space with Epoxy was observed. Some regions of the sample had a few gaps in the Epoxy which were not believed to be enough to deteriorate the quality of the sample as each fiber is still attached to the matrix.

Disc Design and Assembling

Figure 8:
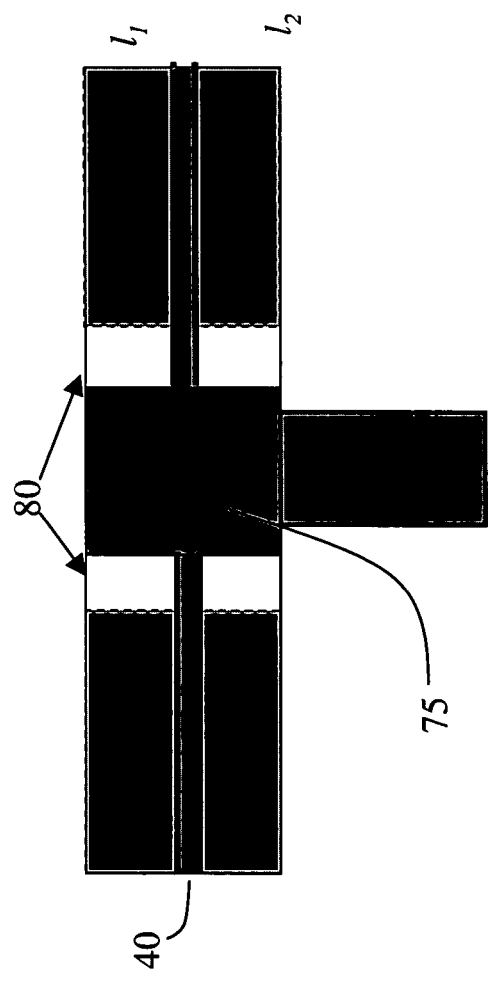
FIG. 8 is a schematic of a first configuration designed to make a sample wherein the fiber coils are attached to the disc but do not touch the center shaft.
Figure 9A:
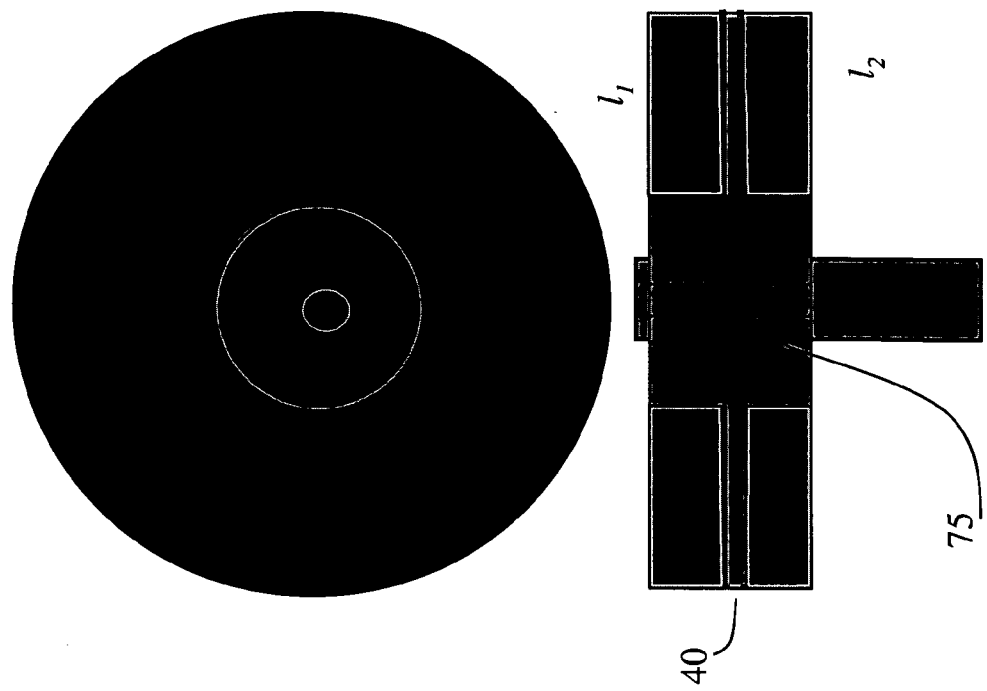
FIGS. 9(a) and 9(b) are cross-sectional views of: (a) the first configuration designed to make a sample having a gap between the fiber coils and the central shaft and (b) a second configuration designed to make a sample having no gap.

It is possible to achieve a scale factor above 10 dB relative to rad/g with a 0.7 inch diameter aluminum disc. FIG. 8 is a schematic of the first sample wherein the fiber coils $l_1$, $l_2$ are attached to the top and bottom of the disc 40 but do not touch the center shaft 75 (i.e., create a gap 80). (Note that the dimensions provided, in inches, are not intended to be limiting and are provided merely to describe the sample tested.) FIG. 9(a) is a cross sectional view of the first sample showing the gap 80 between the fiber coils $l_1$, $l_2$ and the central shaft 75.

Figure 9B:
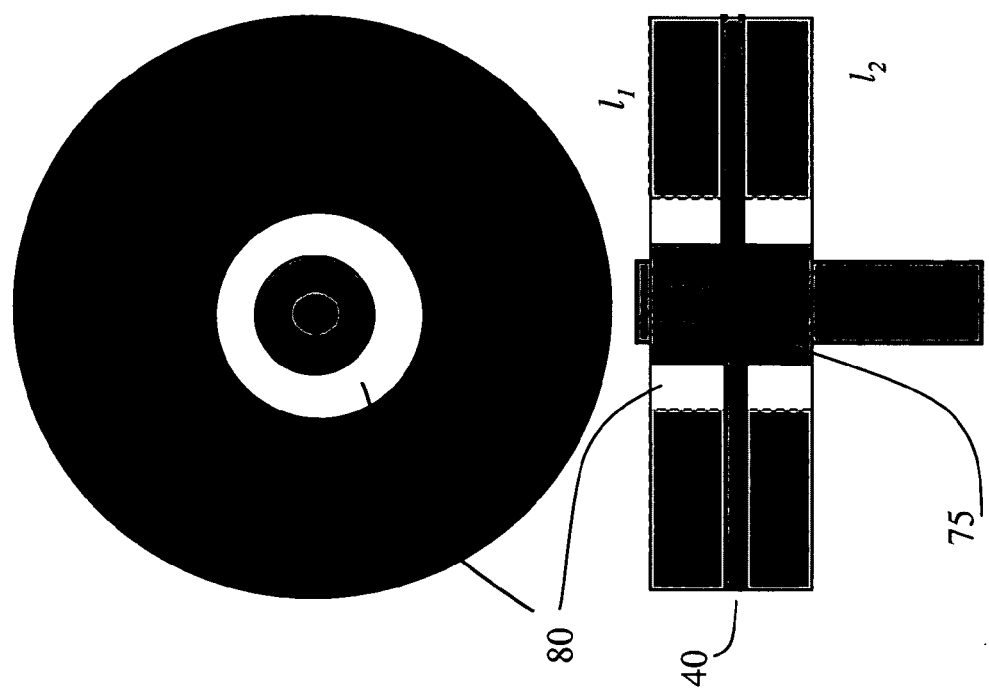

FIG. 9(b) is a cross sectional view of a second sample wherein the fiber coils $l_1$, $l_2$ are in contact with the central shaft 75, i.e., without the gap present in FIG. 9(a). The system without the gap (FIG. 9(b)) simplifies the manufacturing process and increases the resonance frequency of the transducer. However, this design reduces the transducer sensitivity.

Teflon™ molds were designed to hold the fiber coils $l_1$, $l_2$ in place against the disc 40 (of the second sample) so the adhesion to the disc is performed when the resin in the coil is cured. A diagram of the molds is shown in FIGS. 10(a) and 10(b). The molds 85 and discs 40 were mounted into an axle 90 before the coiling of the fiber (not shown). A Teflon™ split ring (not shown) may be used to fill the space of the second coil while the first coil is placed.

FIG. 10(a) shows the assembly of the molds 85 and disc 40 for the design of FIG. 9(a) with a gap 80. This design uses a spacer 95 integral to molds 85 which creates the space between the fibers and the shaft 90. As shown in FIG. 10(a), axle 90 should be designed to fit inside the projecting spacer 95 such that when mold 85 and spacer 95 are removed after assembly of the fibers, a gap will be located between the fiber and axle 90 that is approximately equivalent to the thickness of the spacer 95. FIG. 10(b) shows the assembly for the design for the design of FIG. 9(b), without a gap 80.

The sensor was assembled with Polyimide coated fiber. The Polyimide coated fiber with carbon coating was more brittle than the Acrylate coated fiber, resulting in breakage on handling. Accordingly, only the sensors made with Acrylate fibers are characterized herein.

Characterization

Figure 11:
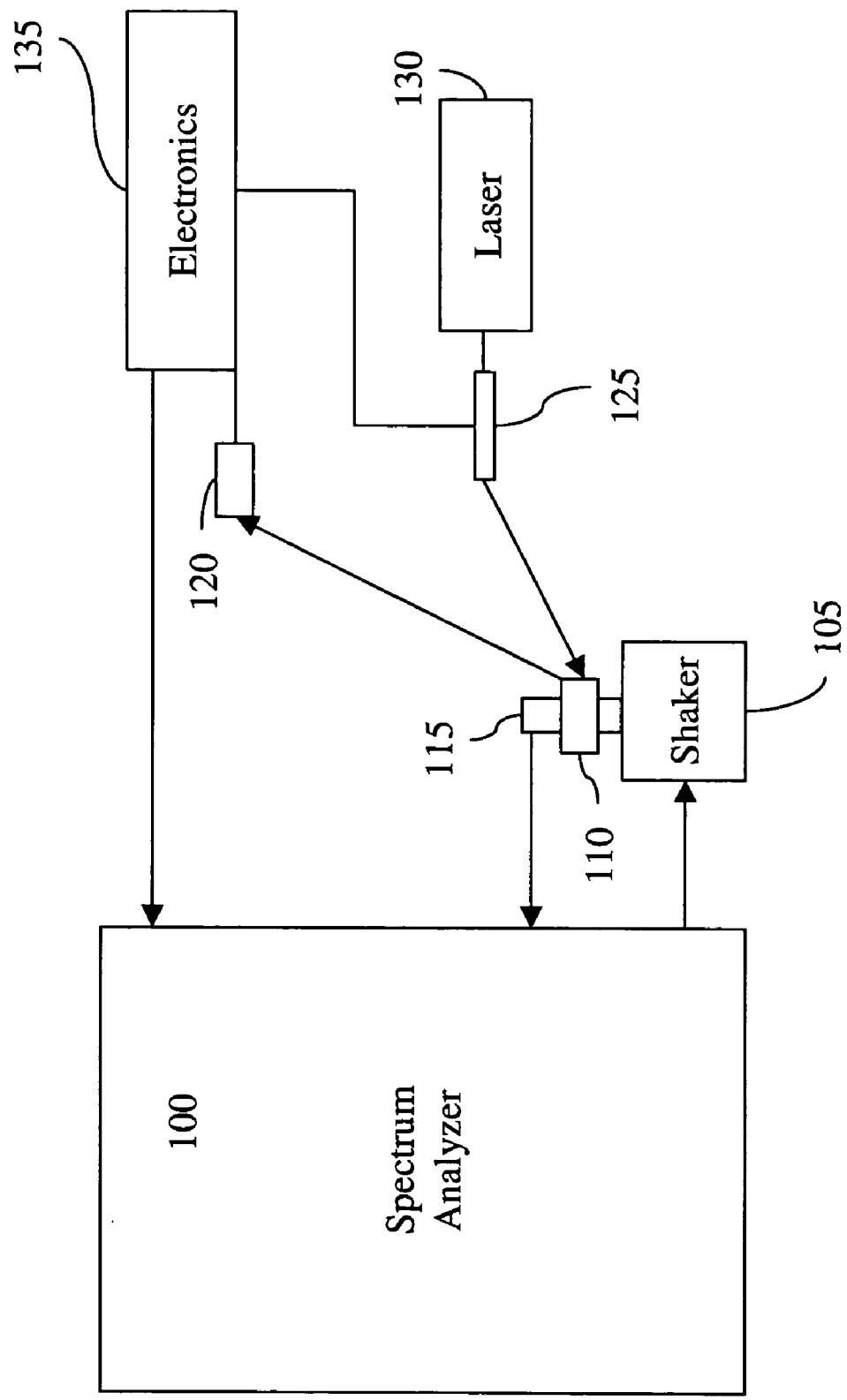
FIG. 11 is a diagram of the characterization electronics.

A diagram of the interrogation system is illustrated in FIG. 11. The system includes a spectrum analyzer 100, a shaker 105, the fiber optic accelerometer 110, a reference accelerometer 115, a detector 120, a modulator 125, a laser 130, and control electronics 135. A signal from the fiber optic accelerometer 110 and a reference signal from the reference accelerometer 115 are provided to the spectrum analyzer 100. The principle of the detection system is described in "Homodyne Demodulation Scheme for Fiber Optic Sensors Using Phase Generated Carrier" by Dandridge et al., IEEE Journal of Quantum Electronics, Vol. QE-18, No. 10, pages 1647–1653, 1982 (incorporated by reference herein in its entirety). A modulated laser 130 is used to extract the phase information from the Michelson interferometer 110 formed by the two coils of fiber $l_1$, $l_2$. A calibrated accelerometer 115 was used as a reference in order to measure the scale factor of the sensor, which reflects the amount of phase shift per unit of acceleration.

Figure 12:
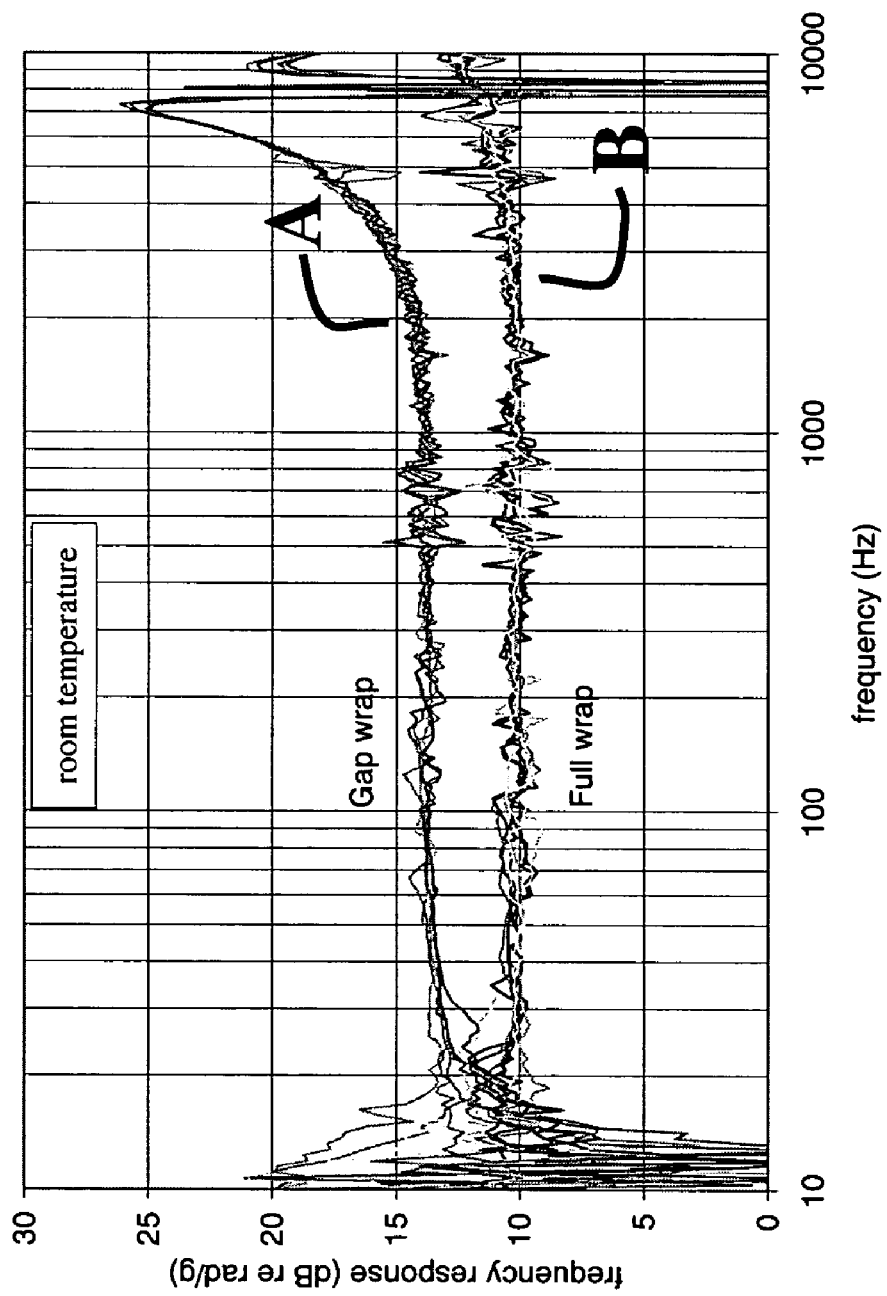
FIG. 12 is a graph depicting the scale factor of the devices of the present invention as a function of frequency at room temperature.

FIG. 12 is a graph of the scale factor of the devices of the present invention as a function of frequency for the configuration with a gap A and the configuration without a gap B. Several measurements were made for each sensor. This is done after moving the position of the leads into the fiber optic sensor 145 and the reference accelerometer 115 before each measurement. It is clear from FIG. 12 that the vibration of the leads have an influence on the measurement. This influence is particularly strong for frequencies below about 25 Hz.

As expected, the sensor with a gap between the fiber coils A and the center shaft has a lower resonance frequency but higher sensitivity at frequencies below resonance than the sensor without a gap B (also referred to as the full wrap sensor).

Figure 13:
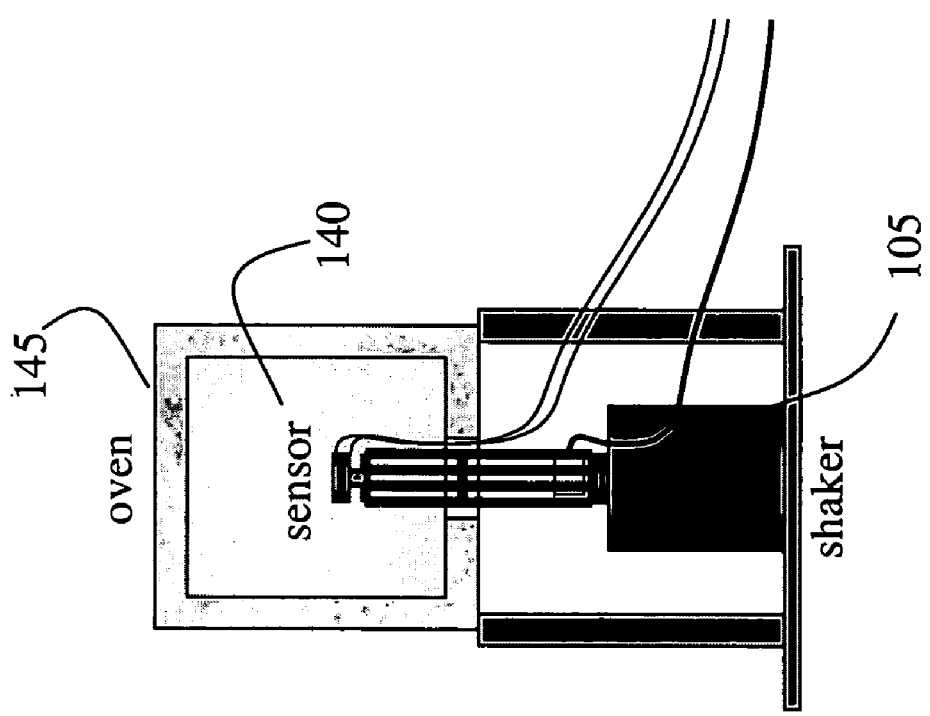
FIG. 13 is a schematic showing the sensor placed inside an oven but with the shaker and reference accelerometer placed outside the oven.

FIG. 13 is a diagram of the experimental setup. The sensor 145 without a gap (the full wrap sensor) was placed into an oven 145 and supported by a light-weight tower which rested over a shaker 105 with a reference accelerometer 115 placed outside the oven 145. This configuration was needed to avoid operating the shaker 105 inside the oven 145.

Figure 14:
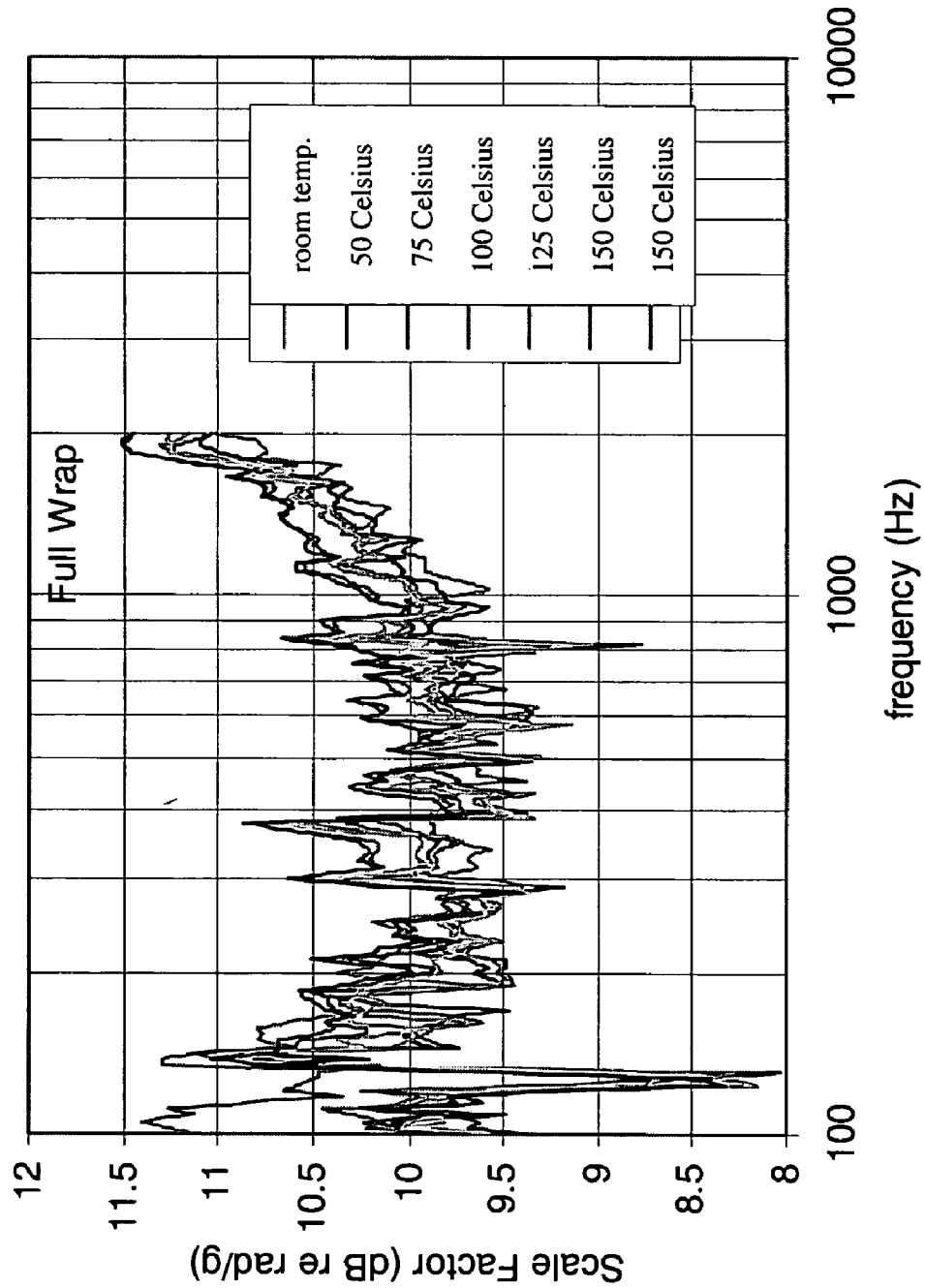
FIG. 14 is a graph showing the scale factor as a function of frequency at room temperature and 50, 75, 100, 125, and 150 degrees Celsius.

The sensor without a gap was tested at room temperature and at 50, 75, 100, 125 and 150 degrees Celsius. The scale factor as a function of frequency for those temperatures is shown in FIG. 14.

The resonance of the system occurs at a lower frequency. This is believed to be caused by the introduction of the light-weight tower connecting the fiber optic sensor to the shaker. The leads connecting the sensor and the reference accelerometer were not moved during measurements at temperatures above ambient and the fluctuation of the scale factor with frequency can be explained by the vibration of the leads. The scale factor tends to increase with temperature but not significantly up to 125 degrees Celsius. An increase of about 0.5 dB was observed between room temperature operation and 150 degrees Celsius.

One non-limiting embodiment of the accelerometer of the present invention is in downhole applications in the oilfield. For example, the device may be adapted for connection to a wireline or logging while drilling tool to allow for measurement of differences in the earth's gravitational acceleration between different depths in the earth to assist in the determination of bulk density (or specific gravity) of various earth formations. These gravity differences may be used to determine whether the formation is primarily oil, water or gas filled at various depths and geographic locations in the earth. Sample applications of this apparatus are described in commonly owned U.S. Pat. Nos. 6,725,924, 6,671,057, and 5,432,699, incorporated by reference herein in their entireties.

While the invention has been described herein with reference to certain examples and embodiments, it will be evident that various modifications and changes may be made to the embodiments described above without departing from the scope and spirit of the invention as set forth in the claims.

What is claimed is:

1. A method of making a fiber optic accelerometer, comprising:
   a) drawing an optical fiber through a resin;
   b) winding said resin coated fiber onto a disc mounted on an assembly having a central shaft such that inter-space of the wound fiber is filled with resin;
   c) curing said resin-coated fiber, such that the fiber bonds to the disc during curing; and
   d) wherein said disc is rotated during said curing.

2. The method of claim 1, further comprising wiping excess resin from said fiber.

3. The method of claim 1, further comprising providing a gap between said central shaft and said resin coated fiber.

4. The method of claim 1, wherein drawing an optical fiber through a resin includes providing a container filled with a resin having an orifice therethrough and drawing said fiber through said orifice.

* * * * *